United States Patent [19]

Blount

[11] Patent Number: 5,156,775
[45] Date of Patent: Oct. 20, 1992

[54] FLAME RETARDANT COMPOSITIONS

[76] Inventor: David H. Blount, 6728 Del Cerro Blvd., San Diego, Calif. 92120

[21] Appl. No.: 778,478

[22] Filed: Oct. 17, 1991

[51] Int. Cl.⁵ .............................................. C09K 21/00
[52] U.S. Cl. .................................. 252/609; 252/610; 427/223; 106/18.13; 106/18.14; 428/921; 525/107; 525/123
[58] Field of Search ............... 252/607, 609, 603, 610; 427/223; 106/18.13, 18.14; 428/921; 525/107, 123

[56] References Cited

U.S. PATENT DOCUMENTS

| 4,373,010 | 2/1983 | Oberley | 428/532 |
|---|---|---|---|
| 4,539,045 | 9/1985 | Wagner | 106/18.13 |
| 4,740,527 | 4/1988 | von Bonin | 521/105 |
| 4,806,620 | 2/1989 | Klett et al. | 528/244 |
| 4,831,062 | 5/1989 | von Bonin | 521/103 |
| 5,034,423 | 7/1991 | Blount | 521/107 |
| 5,089,559 | 2/1991 | Blount | 525/107 |

OTHER PUBLICATIONS

Grant & Hach's Chemical Dictionary, 5th Edition McGraw-Hill Publishing, pp. 92-93.

Primary Examiner—Richard D. Lovering
Assistant Examiner—N. Bhat

[57] ABSTRACT

Flame-retardant compositions are produced by reacting an acidic boron containing compound with a phosphorus containing compound to produce a boron phosphorus containing condensation compound which is mixed with, applied to or reacted with a plastic or a natural product. These compositions may be used as building materials, for insulation, sound proofing, coating agents, molding materials, cushioning, for decorations, furniture, boats, auto body parts and many other uses.

37 Claims, No Drawings

FLAME RETARDANT COMPOSITIONS

BACKGROUND OF THE INVENTION

This invention relates to the production of a flame-retardant product utilized to make flammable components more flame retardant by coating or by incorporating the flame-retardant product of this invention in the components such as plastics and natural products. This novel flame-retardant product is produced by mixing and reacting an acid boron containing compound and an acid phosphorus containing compounds thereby producing a boron phosphorus containing condensation compound.

Many combinations of inorganic and organic chemicals such as phosphates, chlorinated organic compounds, amino compounds, asbestos, borates, antimony trioxide and mixtures thereof have been used in flame or fire retardant plastics. It is very desirable to make natural products such as wool, wood, etc. and plastics flame-retardant because they have many uses such as building materials, for insulation, sound proofing, cushioning, for decorations, furniture, coatings, stains, boats, auto body parts and many other uses.

The object of this invention is to provide flame-retardant natural products and plastics by making easily inflammable or normally inflammable plastics materials flame-proof sufficient enough for Class B, of DIN 4102 by German standard and comparable test in other countries. It is also the object of this invention to make the plastics and natural products flame-retardant without impairing the desired properties of the materials. It is also the object of this invention to produce flame-retardant boron phosphorus condensation compound and boron organic phosphorus condensation compounds.

SUMMARY OF THE INVENTION

The flame-retardant compounds of this invention are produced by chemically reacting an acidic boron compound with an acidic phosphorus containing compound, while not wishing to be bound by any theory of operation there appear to be a chemical reaction between the boron and an oxygen atom on the acidic phosphorus containing compound or a chemical reaction between the oxygen atom on the boron and the phosphorus atom to produce a boron phosphorus containing condensation compound. When the acidic boron compound such as boric acid and the acidic phosphorus compound such as phosphoric acid are mixed and heated together then are dehydration and condensation taking place to produce a solid mixture of compounds such as boron polyphosphoric acid, boron dihydrogen phosphoric acid, boron hydrogen phosphoric acid, boron triphosphoric acid, boron phosphate and other dehydration products of boric acid and phosphoric acid. The exact chemical structure of this condensated compound is not known. Boron has both the properties of a metal or a non-metal compound. When boron halides and phosphorus halides are utilized it is desirable for water to be present, either free water or attached water.

When the boron phosphate condensation product is applied to, mixed into or reacted with a flammable material and this material is subject to a flame it causes the outer surface of this material to char and the flame does not spread. The exact process that takes place to prevent the flame from spreading is not known. The boron phosphorus condensation product or the organic boron phosphorus condensation product may be utilized in the amount of 3 to 75 percent by weight based on the weight of the flame-retardant material.

The boron phosphorus condensation product may be added to the plastics or natural materials at any suitable temperature or pressure and may be added to the plastics when it is being produced from its monomer compound, when in a liquid state, when it is in an aqueous emulsion, when it is in a powder or granular form or when it is in a melted form. The method to add the boron phosphorus condensation product to the plastics or natural products depend on the type of materials being utilized. When plastics are not normally melted to form products it is preferable to add the boron phosphorus condensation product to the liquid components of the plastics such as polyurethane, polyester resins and epoxy components.

When the boron phosphorus containing condensation product of this invention is used as a flame-retardant coating, for example on wood, it may be combined with a binder resin such as vinyl chloride-vinyl acetate copolymer, epoxy coating agents, polyurethane coating agents, polyester coating agents, varnishes, paints, lacquers, etc., cement, plaster, etc., and mixtures thereof.

Flame-retardant compounds and compositions are produced by mixing and reacting the following components:

Component A: An acidic boron containing compound;
Component B: An acidic phosphorus containing compound;
Component C: A basic salt-forming compound for adjusting the pH of the compound;
Component D: a plastic and/or natural material;

Component A and B are first mixed and reacted to produce a boron phosphorus containing condensation product then it is reacted with Component C to adjust the pH and then mixed or reacted with Component D.

Component A

Any suitable acidic boron containing compound may be used in this invention. Suitable compounds include but are not limited to boric acid, boron oxide, boron halides, alkali metal borates, alkaline earth metal borates, metal borates, organic boron compounds, perborates and mixtures thereof.

Boric acid is the preferred acidic boron containing compound. Suitable boric acid include orthoboric acid, metaboric acid, tetraboric acid and mixtures thereof. Suitable boron halides include boron trifluoride, fluoboric acid, boron trichloride, boron tribromide and mixtures thereof.

Component B

Any suitable acidic phosphorus containing compound may be utilized in this invention. Suitable compounds include but are not limited to, phosphoric acid, pyrophosphoric acid, triphosphorus acid, metaphosphoric acid, phosphorus acid, hypophosphorous acid, phosphinic acid, phosphinous acid, phosphine oxide, alkylchlorophosphines, phosphorus oxyhalides, phosphorus trichloride, phosphorus oxide, mono-magnesium phosphate, mono-aluminum phosphate, halogenated phosphatephosphite and their halides and acids, halogenated phosphorus esters, halogenated bis (phosphite), bis (phosphorus halogenated phosphate-phosphite), phosphorus trioxide, phosphorus pentaoxide, phosphorus thiochloride and mixtures thereof. Phosphoric acid is the preferred acidic phosphorus containing compound.

The phosphorus containing compound, especially the halogenated phosphorus compounds may be first reacted with any suitable organic compound such as alcohols, polyalcohols, epoxides, polyepoxides, oxirane, amines, amino, organic acid but preferable leaving some halogenated radicals on the phosphorus atom which can be reacted with a boron containing compound or water. Boric acid when dehydrated produces water which will react with the halogen atom on the phosphorus compound to produce an acid radical on the phosphorus atom.

Component C

Any suitable basic salt forming compound may be used in this invention. Suitable compounds include, but are not limited to compounds containing alkali metal, alkaline earth metal, metal and ammonia radicals and mixtures thereof.

Suitable alkali metal compounds include compounds containing sodium, potassium, lithium, rubidium, cesium and mixtures thereof in the form of but not limited to, compounds such as metals, oxides, hydroxides, carbonates, bicarbonates, salts of organic acids, silicates, natural minerals and mixtures thereof. Alkali metal sulfates, nitrates and halides are not suitable to react with the boron-phosphorus condensation compound to adjust the pH.

Suitable alkaline metal compounds include compounds containing calcium, strontium, magnesium, barium, beryllium and mixtures thereof, in the form of but not limited to compounds such as metal, oxides, hydroxides, carbonates, salts of organic acids, natural minerals, silicates and mixtures thereof.

Suitable ammonia compounds include compounds containing ammonia such as, but not limited to, ammonia, ammonium carbonate, ammonium salts of organic acid, ammonium silicates, quaternary ammonium hydroxide, ammonium hydroxides, amino compounds, e.g., urea, alkylurea, decyandiamide, melamine, guanidine, aminoguanidine, amines, e.g., aliphatic amines, aromatic amines, polyamines and mixtures thereof.

Salts of sulfuric acid, nitric acid and halide acids are not suitable because they will not react with phosphorus containing compounds.

Component D

Any suitable plastic resin composition or mixtures thereof and any suitable natural organic material may be used in this invention and mixtures thereof. These materials may be in the form of a solid, cellular suspension, emulsion or solution. Suitable plastic resin include, but are not limited to, vinyl dienes, vinyl-diene copolymers, polyesters, polyester resins, phenoplasts, aminoplasts, polyepoxy urethanes, furans, polyamides, polyimides, polycarbonates, homopolymers of such olefins as ethylene, propylene and butylene; block copolymers, consisting of optional combination of these olefins; polymers of vinyl compounds such as vinyl chloride, acrylonitrile, methyl acrylates, vinyl acetates and styrene; copolymers consisting of optional combination of these monomers; copolymers of the foregoing olefins with vinyl monomers, copolymers and terpolymers of the foregoing olefins, with diene compounds; polyesters such as polyethylene terephthalate; polyamides such as nylon; polycarbonates, polyoxymethylene; silicones, polyethers, thioplasts, polytetrafluorocthylene, polysulfones, vinyldienes, poly(vinyl acetate), poly(vinyl alcohol), poly(vinylacetate), aliphatic allyl compound, polyacrylonitrite, aliphatic dienes, polybutadiene, butadiene-acrylonitrile, butadiene-styreno copolymers, aromatic vinyl compounds, heterocyclic vinyl compounds, cyclic unsaturated compounds, urethane-epoxy resins, silicone-urethane resins, silicone-epoxy resins, polyimides, urethane silicates, cellulose nitrate rayon, regenerated cellulose film, cellulose acetate, cellulose esters, cellulose ethers, cyanoethyl cellulose, chlorinated rubber and mixtures thereof.

Suitable natural products include but are not limited to, wood, cellulose, lignin-cellulose, paper, cotton, wool, dammars, copols, other natural resins, rosin, lignin, natural rubber, natural proteins, e.g., soya bean protein, silk, glues, gelatin, etc.; starch shellac, zelan, polyamides from milk, peanuts, corn, etc.; modified cellulose and mixtures thereof. Natural organic material and plastics may be mixed together.

Component E

Any suitable organic compound that will react with the boron phosphorus containing condensation product may be used in this invention to react with the boron phosphorus containing condensation product to produce an organic boron phosphorate condensation product. Suitable organic compounds include, but are not limited to, alcohols, polyalcohols, epoxides, polyepoxides, organic acids and anhydrides, polycarboxyl acids and anhydrides, isocyanates, polyisocyanates, thioalcohols, thiophenols, aldehydes, halogenated alcohols and polyalcohols, epihalohydrins, halogenated organic acids and polycarboxyl acids, sulphonic acid chlorides, organic esters, ethers, thioethers, halomethyl compounds, ketones, nitriles, sulphonic acids, amines, polyamines, polyamides, and mixtures thereof. Compounds which contain one OH group and/or at least one other hydrophilic and/or polar group which has the general formulae: $RSH$, $RCH_2Cl$, $RCHBr$, $RCH_2I$, $RCN$, $RNO_2$, $RCOCl$, $RCOBr$, $RSO_2Cl$, $RCOOH$, $RS_2OH$, $RCOO$, $RSO_2$, $ROR$,

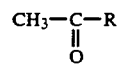

wherein R denotes a methyl, ethyl or propyl group, may be used in this invention. Epoxides are the preferred organic compound but may be used with a polyol.

DETAILED DESCRIPTION OF THE INVENTION

The mixture of the components of this invention may take place in any suitable physical condition. Ambient pressure is usually satisfactory except when a gas compound is used, then it may be necessary to compress the gas until it is in the form of a liquid. In reacting the acidic boron and acidic phosphorus containing compound an elevated temperature is usually necessary ranging from 100° C. to 200° C. The boron phosphorus containing condensation product is usually applied on, mixed with or reacted with the flammable material at ambient temperature and pressure. The boron phosphorus condensation product is preferred to be in the form of a fine powder. The flammable material may be in any suitable form such as a liquid, solution, emulsion, melted, pellets or powder.

The boron phosphorus containing condensation product is preferably produced by mixing an acidic boron compound and an acidic phosphorus containing compound at ambient pressure then heating the mixture to 100° to 200° C. for 30 minutes to two hours to produce a solid product which is then pulverized into a fine powder.

The boron phosphorus containing condensation product may be chemically reacted with an epoxy compound by mixing them at ambient temperature and pressure. When an excess amount of heat is produced it may be necessary to cool the mixture. The boron phosphorus containing condensation product may also be reacted with compounds containing 1 or more hydroxyl groups by mixing the powdered boron phosphorus containing condensation product with the alcohol or polyol and heating the mixture to just below the boiling point of the alcohol or polyalcohol (polyol) for 30 minutes to 12 hours thereby producing a flame-retardant organic boron phosphorate condensation product with hydroxyl radicals. The organic compound that will react with the phosphorus compound may be also added with the acidic boron and acidic phosphorus compound.

When it is desirable to adjust the pH of the boron phosphorus condensation product, a basic salt forming compound may be added to and reacted with the boron phosphate condensation product usually at ambient temperature and pressure. Sometimes it is desirable to react the mixture in a liquid.

The epoxy and polyalcohol compounds may be added together and reacted with the boron phosphorus condensation product and also with each other. The epoxy alcohol and/or polyol may be added with the acidic boron compound and acidic phosphorus containing compound before they are reacted together thereby producing an organic boron phosphorus condensation product.

Any suitable epoxy compound may be chemically reacted with the boron phosphorus containing condensation product, suitable epoxy compounds include but are not limited to alkyl epoxide such as ethylene oxide, propylene oxide, butylene oxides, trichlorobutylene oxide, epihalohydrins, 2,3-epoxybutane, 1,2 epoxydecane 1,2-epoxyactadecane; unsaturated ether, epoxide such as allyl glycedyl ether; dealkylatable epoxide such as tert-butyl glycidyl ether; and other polyepoxides and mixtures thereof. The epihalohydrins are preferred.

Any suitable alcohol or polyalcohols may be chemically reacted, suitable alcohols include, but are not limited to, oliphatic alcohols such as methanol, ethanol, sec-butanol, 1-buten-4-ol and propargyl alcohol and substituted alcohols such as 2-fluorothanol, 2-chloroethanol, 2-bromoethanol, 2-iodethanol, 2-cyanoethanol; aromatic alcohols such as phenol and benzyl alcohols and mixtures thereof. Alkyl alcohols are preferred.

Suitable polyalcohols include but are not limited to diols such as ethylene glycol, propylene glycol, butylene glycol, polyethylene glycol, polypropylene glycol, polybutylene glycol, triols such as 1,2,3-propanetriol, 1,2,4-butanetriol, 1,2,10-decanetriol, 2,2-bis(hydroxymethyl)-1-octanol and 2-methyl-2-(2-hydroxyethoxy)-methyl-1,3-propanediol, B neocarbyltriol, other polyols may be used such as, but not limited to sucrose polyols, sucrose amine polyols, polypropylene polybutylene polyols, phenyl polyols, phenylamine polyols, polyether polyols, polyepichlorohydrin, polyepibromohydrin, sorbitol polyol, pentaerythritol, polythioether polyols, polyacetal polyols, polycarbonate polyols, polyester amide and polyamide polyols, modified or unmodified natural polyols and mixtures thereof. The polyols may contain halo, cyano, ether, thioether, sulfoxy and ocyl ester radicals.

Any suitable isocyanate may be used in this invention. Organic polyisocyanates are preferred. The commercial available ones are preferred such as tolylene-2-4-diisocyanate, tolylene-2,6-diisocyanate, polymethylene polyphenyl isocyanate, diphenyl methane 4,4'diisocyanate, 3-methyldiphenyl-methane-4,4'-diisocyanate, m-and-p-phenylenediisocyanate, polyphenylpolymethyleneisocyanates obtained by phosgenation, commercially known as "crude MDI", modified polyisocyanates and mixtures thereof. Suitable organic polyisocyanate are exemplified by the organic diisocyanates which are compounds of the general formula:

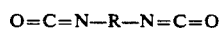

$$O=C=N-R-N=C=O$$

wherein R is a divalent organic radical such as an alkylene, aralkylene or arylene radical. Such radical may contain 2 to 20 carbon atoms.

Urethane catalyst such as tertiary amines, alkali metal salts of weak acids, inorganic bases, organometallic compounds such as organotin compound may be used in this invention. Surfactants and foam stabilizer such as a nonhydrolizable silicone glycol copolymer may also be used in this invention. Surfactants may also be used to assist in the dispersion of the powdered boron phosphate condensation product in the plastics. Any suitable surfactant may be used such as ionic, cationic and nonionic surfactants.

Any suitable polyurethane blowing agent may be used such as halogenated alkanes, compressed air, organic gases, etc. Compounds which decompose at temperatures above room temperature with liberation of gases may also be used as blowing agents.

When the boron phosphorus containing condensation product is added to the monomers that produce the plastics it is necessary to add a catalytic amount of a radical initiator such as peroxides. The boron phosphorus containing condensation product may react with the natural materials or plastics when they contain free radical as found in component E, such as hydroxyl, aldehyde, epoxide, amine, ketone, acid, nitrile, etc.

The ratio of the essential reactants and optional reactants which lead to the production of flame-retardant compounds and compositions of this invention may vary, broadly speaking, with ranges as follows:

a) 1 to 25 parts by weight of an acidic boron containing compound;
b) 1 to 100 parts by weight of an acidic phosphorus containing compound;
c) up to 100 parts by weight of a basic salt-forming compound for adjusting the pH;
d) 1 to 500 parts by weight of a plastic and/or natural material;
e) up to 100 parts by weight of a compound containing 2 or more isocyanate radicals or containing 1 or more isocyanate radicals and 1 or more polymerable unsaturated radicals;
f) up to 20% by weight of an emulsifying agent;
g) up to 20% by weight of a foam stabilizer;
h) up to 50% by weight of a chemically inert glowing agent;

i) up to 10% by weight of polyisocyanate catalyst such as amine and organo-metallic catalyst;
j) up to 20% by weight of water;
k) up to 200% by weight of fillers;
l) up to 200 parts by weight of an organic compound that will react with the boron phosphorus containing condensation product to produce organic boron phosphorate condensation products;
m) catalytic amount of a radical initiator;
Percentage is based on weight of the reactants.

DESCRIPTION OF PREFERRED EMBODIMENTS

My invention will be illustrated in greater detail in the specific examples which follow, which detail the preferred embodiment of my process. It should be understood that the scope of my invention is not limited to the specific processes set out in the examples. Parts and percentages are by weight, unless otherwise indicated.

EXAMPLE 1

About 10 parts by weight of boric acid are mixed with 40 parts by weight of phosphoric acid (concentration of 70% $H_3PO_4$) then heated until the water evaporated and then the compounds solidify to form a boron phosphorus containing condensation product. The solid compound is pulverized to form a fine powder.

EXAMPLE 2

Example 1 is modified to where the ratio of boric acid to phosphoric is selected below:
a) 5 parts by weight of boric acid to 35 parts by weight of phosphoric acid;
b) 15 parts by weight of boric acid to 25 parts by weight of phosphoric acid;
c) 20 parts by weight of boric acid to 20 parts by weight of phosphoric acid;
d) 25 parts by weight of boric acid to 15 parts by weight of phosphoric acid;

EXAMPLE 3

Example 1 is modified wherein another boron containing compound is used in place of boric acid and selected from the list below:
a) boron oxide
b) boron chloride
c) zinc borate
d) sodium borate
e) calcium borate

EXAMPLE 4

Example 1 is modified wherein another phosphorus containing compound is used in place of phosphoric acid and selected from the list below:
a) pyrophosphoric acid
b) triphosphorus acid
c) metaphosphoric acid
d) phosphorus acid
e) hypophosphorous acid
f) phosphinic acid
g) phosphinous acid
h) phosphine oxide
i) dimethyl methyl phosphonate
j) phosphorus oxychloride
k) phosphorus oxide
l) ammonium dihydrogen phosphate
m) methyl methyl phosphoric acid

EXAMPLE 5

The powdered boron phosphorus containing condensation produced is mixed with basic salt form compound selected from the list below and reacted in an aqueous solution to form a salt of boron phosphorate condensation product:
a) ammonia
b) urea
c) melamine
d) sodium carbonate
e) zinc hydroxide
f) calcium hydroxide
g) aluminum hydroxide
h) ethylamine
i) diethylenetriamine
j) thiourea
k) ammonia silicate
l) talc
m) calcium silicate
n) ammonium carbonate
o) dicyandiamide
p) ethyl urea

EXAMPLE 6

The powdered boron phosphorus containing condensation compound is mixed and reacted with an epoxy compound selected from the list below to produce an organic boron phosphate compound:
a) propylene oxide
b) epichlorohydrin
c) ethylene oxide under pressure in a closed system
d) butylene oxide
e) polyepoxide (bis-epoxides of polyalkylene ether glycol)
f) ethylene oxide under pressure
g) epibromohydrin
h) epoxidized soy bean oil

EXAMPLE 7

Example 6 is modified wherein a catalytic amount of boron fluoride is added to epoxy compound.

EXAMPLE 8

An aqueous emulsion containing 20% by weight of the powdered boron phosphorus containing condensation product produced in Example 1 is applied to a 2"×8" piece of cedar shingle and let it dry for 24 hours. The shingle is then tested by applying a ½ propane torch flame to about 1" from the shingle for 1 minute and the flame did not spread. The untested area of the shingle was then washed in water thoroughly, then dried. This re-washed portion was flametested as above and the flame did not spread.

EXAMPLE 9

Example 8 is modified by using another natural product or modified natural product instead of wood and selected from the list below:
a) paper
b) cardboard
c) masonite
d) wool
e) shellac
f) cotton
g) rayon

EXAMPLE 10

About 50 parts by weight of granular polystyrene and 10 parts by weight of the powdered boron phosphorus condensation compound produced in Example 1 are thoroughly mixed and then heated sufficient to melt the polystyrene and then poured into a mold. The molded plastic is then flame tested using a ⅛" propane torch flame held 1" from the plastic for 1 minute. The flame did not spread and went out as soon as the flame was removed.

EXAMPLE 11

Example 10 is modified wherein another flammable material is used in place of polystyrene and selected from the list below:
a) polymethyl methyl acrylate
b) nylon
c) polyethylene
d) polypropylene
e) poly(cyclohexyl methacrylate)
f) polyester
g) poly(vinyl chloride-methyl acrylate)
h) polyvinylchloride
i) cellulose acetate
j) phenol-formaldehyde
k) urea formaldehyde
l) cellulose acetate-butyrate
m) melamine-formaldehyde

EXAMPLE 12

About 10 parts by weight of the boron phosphoric condensation compound produced in Example 1 are added to an aqueous emulsion of polyvinyl chloride polymer then dried to form an ⅛" thick sheet. The polyvinyl chlorine polymer was exposed to a ⅛" propane flame for 1 minute and the flame did not spread.

EXAMPLE 13

Example 12 is modified wherein another aqueous emulsion of plastic is used in place of the polyvinylchloride polymer and selected from the list below:
a) polyvinyl alcohol
b) polyvinyl acetate
c) polystyrene
d) polyester
e) polyepoxy
f) rubber latex
g) butadiene-styrene
h) polychloroprene
i) poly(methyl methacrylate)
j) polyurethane
k) polystyrene
l) poly(ethylene-vinyl acetate)
m) phenol-formaldehyde
n) urea-formaldehyde
o) melamine-formaldehyde
p) polyisoprene
q) butadiene-acrylonitrile
r) poly(methyl acrylic acid)
s) poly(acrylic acid)

EXAMPLE 14

About 5 parts by weight of the melamine boron-phosphate condensation compound produced in Example 5C are added to 25 parts by weight of sucrose amine polyol (OH no. 475) and 25 parts polyisocyanate (Mondur MR by MOBAY) which react to produce a solid flame-retardant polyurethane product. This product was tested with a ⅛" propane torch flame for 1 minute and the flame did not spread.

EXAMPLE 15

Example 14 is modified wherein 5 parts by weight of "FREON 12", 0.5 parts by weight of a foam regulator (L5420 by Union Carbide), 0.02 parts by weight of a tin polyurethane catalyst ($T_{12}$ by Air Products) and an amine polyurethane catalyst (Polycat R 8020 by Air Products) are added to the polyol thereby producing a foamed flame-retardant polyurethane product. This product was tested with a ⅛" propane torch flame for 1 minute and the flame did not spread.

EXAMPLE 16

About 5 parts by weight of the organic boron phosphate condensation compound produced in Example 6b are added and mixed into about 50 parts by weight of a solution of silicone rubber. The resin hardens into a ⅛" sheet. The resin sheet is flame tested with a ⅛" propane flame for 1 minute and the flame did not spread.

EXAMPLE 17 Example 16 is modified wherein another solution of a resin is used in place of silicone rubber and selected from the list below:

a) polystyrene
b) poly(methyl methacrylate)
c) polyvinyl chloride
d) poly(acrylic acid)
e) poly(methyl acrylic acid)
f) poly(vinyl acetate)
g) polyester
h) poly(vinylidene chloride)
i) methyl styrene
j) methyl cellulose
k) nitrocellulose
l) phenol-formaldehyde
m) poly(vinyl formal)
n) poly(vinyl pyrrolidone)
o) polysulfones

EXAMPLE 18

About 5 parts by weight of the boron-phosphorus condensation compound produced in Example 3a are added to 40 parts by weight of polyester resin containing a catalytic amount of methyl ethyl ketone peroxide. The resin hardens into a ¼" sheet. The resin sheet is flame tested with a ⅛" propane flame for 1 minute and the flame did not spread.

EXAMPLE 19

Example 18 is modified wherein another polymerizable compound with a catalytic amount of a radical initiator is used in place of the polyester resin and selected from the list below:
a) styrene
b) methyl acrylate
c) methyl methacrylate
d) acrylonitrile
e) isoprene
f) vinyl acetate
g) acrylic acid
h) chloroprene
i) acrylonitrile
j) vinyl chloride under pressure
k) vinylidene chloride
l) vinyl pyrrolidone

EXAMPLE 20

About 10 parts by weight of the boron phosphorus condensation product produced in Example 1 are mixed with 20 parts by weight of propylene glycol then heated to just below the boiling point of the polyol for 1 to 12 hours thereby producing a boron phosphate polyol.

EXAMPLE 21

Example 20 is modified wherein another polyol is used in place of propylene glycol and selected from the list below:
a) ethylene glycol
b) diethylene glycol
c) butylene glycol
d) polyethylene glycol
e) polypropylene glycol
f) glycerol
g) polypropylene triol (OH no. 56)
h) trimethylol propane
i) polyester polyol
j) polyepichlorohydrin polyol
k) 4,4-(dihydroxydiphenyl propane)
l) polybutadiene polyol
m) phenol-formaldehyde polyol
n) amine polyol (OH no. 475)
o) sorbitol-based polyol (OH no. 490)
p) aromatic polyester polyol (OH no. 405)
q) sucrose polyether polyol (OH no. 380)
r) sucrose amine polyol (OH no. 413)
s) mixtures of the above
t) silicone polyol

EXAMPLE 22

Example 20 is modified wherein 20 parts by weight of polyisocyanate (PAPI 27 by DOW) are mixed and reacted with the boron phosphate polyol thereby producing a flame-retardant polyurethane product.

EXAMPLE 23

Example 20 is modified wherein an epoxy compound in the amount of 10 parts by weight are added with the polyol and selected from the list below:
a) epichlorohydrin
b) propylene oxide
c) ethylene oxide under pressure
d) butylene oxide
e) trichlorobutylene oxide
f) epibromohydrin
g) tetrahydrofuran
h) polyepoxide

EXAMPLE 24

Example 23 is modified wherein 30 parts by weight of a polyisocyanate (MONDUR MR by MOBAY) are mixed and reacted with the boron phosphate polyol produced in the following examples thereby producing flame-retardant polyurethane products:
a) 23a
b) 23b
c) 23d

EXAMPLE 25

Example 22 is modified wherein about 0.25 parts by weight of a tertiary amine (Al by UNION CARBIDE), 0.25 parts by weight of a organotin catalyst (DABCO $T_{12}$ by AIR PRODUCTS), 0.5 parts by weight of foam stabilizer (L6202 by UNION CARBIDE) and 5 parts by weight of FREON 11 by DU PONT are mixed with the boron phosphate polyol thereby producing a foamed flame-retardant polyurethane production.

EXAMPLE 26

Example 20 is modified wherein 30 parts by weight of a polycarboxyl and selected from the list below are added with propylene glycol thereby producing a flame-retardant polyester resin:
a) adipic acid
b) phthalic acid
c) succinic acid
d) sebacic acid
e) azelaic acid
f) maleic acid
g) fumaric acid

EXAMPLE 27

Example 6 is modified wherein 30 parts by weight of a polycarboxyl anhydride selected from the list below is added with the epoxy compound thereby producing a flame-retardant polyester resin:
a) tetrahydrophthalic acid anhydride
b) phthalic anhydride
c) glutaric anhydride
d) maleic anhydride
e) tetrahydrophthalic acid anhydride
f) glutaric anhydride

EXAMPLE 28

10 parts by weight of the boron phosphorus containing condensation product produced in Example 1 are added to 40 parts by weight of a polyepoxide resin selected from the list below, thereby producing a flame-retardant polyepoxy product:
a) epoxidized soy bean oil
b) bisphenol A [2,2-(4-bishydroxy phenol)-propane].
c) diglycidil ether of bisphenol
d) epoxidized unsaturated fatty acids
e) epoxidized oil Although specific materials and conditions were set forth in the above examples, these are merely illustrative of preferred embodiment of my invention. Various other compositions, such as the typical materials listed above may be used where suitable. The reactive mixtures and products of my invention may have other agents added hereto to enhance or otherwise modify the reaction and products.

Other modifications of my invention will occur to those skilled in the art upon reading my disclosure. These are intended to be included within the scope of my invention as defined in the appended claims.

I claim:

1. The process for the production of flame-retardant composition which consist of mixing and reacting the following components:

component A: acidic boron containing compound, 1 to 25 parts by weight ;
component B: acidic boron containing compound, 1 pound, 1 to 100 parts by weight ;
component C: basic salt forming compound, up to 100 parts by weight to adjust the pH;
component D: plastic and/or natural material, 1 to 500 parts by weight;

components A and B are first mixed and reacted to produce a boron-phosphorus containing condensated product, which is then mixed and reacted with Component C to adjust the pH then mixed with and/or applied to Component D.

2. The flame-retardant composition produced by the process of claim 1.

3. The process of claim 1 wherein the acidic boron containing compound is selected from the group consisting of boric acid, boron halides, alkali metal borates, alkaline earth metal borates, metal borates, boron oxides and mixtures thereof.

4. The process of claim 1 wherein the acidic phosphorus containing compound is selected from the group consisting of phosphoric acid, phosphorus oxychloride, phosphorus trichloride, mono-magnesium phosphate, mono-aluminum phosphate, organic acid phosphates, pyrophosphoric acid, triphosphoric acid, metaphosphoric acid, phosphorous acid, hypophosphoruous acid, phosphorus oxide, mono-alkali metal dihydrogen phosphate, phosphinic acid, phosphinous, phosphine oxide, alkylchlorophosphines and mixtures thereof.

5. The process of claim 1 wherein the basic salt forming compound is a basic compound which will react with acidic radicals and selected from the group consisting of compounds alkali metal radicals, alkaline earth metal radicals, metal radicals and ammonia radicals; ammonia; organic ammonia containing compounds, amines, polyamines, amino compounds and mixtures thereof.

6. The process of claim 1 wherein the natural products is selected from the group consisting of wood, modified cellulose, cellulose, lignin-cellulose, wool, natural proteins, paper, cotton, natural resins, natural rubber, starch, rosin, shellac and mixtures thereof.

7. The process of claim 1 wherein the plastic is selected from the group consisting of phenoplasts, aminoplasts, polyesters, polyamides, silicones, polyethers, thioplasts, furan resins, vinyl resins, rubber-allyl chloride, allyl alcohol, polyepoxy, dienes, vinyl-dienes, cyclic resins, polyimides, vinyl-olefin copolymer, diene-olefin copolymer, vinyl-diene olefin copolymers, polycarbonates and mixtures thereof.

8. The flame-retardant boron-phosphorus containing condensation product produced by the process of claim 1, comprising mixing and reacting components A and B wherein A is boric acid and B is phosphoric acid.

9. The process of claim 1 wherein an organic compound that will react with an acidic phosphorus containing compound is added with or to the reacted components A and B, a boron-phosphorus containing condensation product, and reacted with boron-phosphorus containing condensation product thereby producing a flame-retardant organic boron phosphate condensation product.

10. The product produced by the process of claim 9.

11. The process of claim 9 wherein the organic compound is selected from the group consisting of alcohols, polyalcohols, epoxides, polyepoxides, polyisocyanates and mixtures thereof.

12. The process of claim 1 wherein an organic compound that will react with an acidic phosphorus containing compound is mixed and reacted with the product produced by reacting Component A and B thereby producing a flame-retardant organic boron phosphate condensation product.

13. The product produced by the process of claim 12.

14. The process of claim 12 wherein the organic compound is selected from the group consisting of alcohols, polyalcohols, epoxides, polyepoxides, polyurethanes and mixtures thereof.

15. The process of claim 1 wherein an organic polyisocyanate is added with Component C to the reacted Components A and B, boron-phosphorus containing condensation product and reacted thereby producing a flame retardant polyurethane composition.

16. The product produced by the process of claim 15.

17. The process of claim 1 wherein up to 100 parts by weight of an organic polyisocyanate and up to 200 parts by weight of polyol are added with Component C to the reacted Components A and B, a boron-phosphorus containing condensation product and reacted thereby producing a flame-retardant polyuretane composition.

18. The product produced by the process of claim 17.

19. The process of claim 1 wherein the following components are added with Component C to the reacted Components A and B, a boron-phosphorus containing condensation product and reacted:
a) up to 100 parts by weight of an organic polyisocyanate;
b) up to 200 parts by weight of a polyol;
c) up to 20% by weight of a foam stabilizer;
d) up to 10% by weight of polyisocyanate catalysts;
e) up to 50% by weight of a chemically inert blowing agent;
f) up to 200% by weight of fillers;
percentage based on weight of the reactants, thereby producing a flame-retardant polyuretane.

20. The product produced by the process of claim 19.

21. The process of claim 1 wherein polymerizable monomer and a catalystic amount of a radical initiator are added to the reacted Components A and B, a boron-phosphorus containing condensation product, in place of Component D, and reacted.

22. The product produced by the process of claim 21.

23. The process of claim 1 wherein a polyester resin and a catalytic amount of a radical initiator are added to the reacted Components A and B, a boron-phosphorus containing condensation product, with Component C and reacted thereby producing a flame-retardant polyester composition.

24. The product by the process of claim 23.

25. The flame-retardant composition produced by mixing and reacting the following components:
a) flame-retardant boron-phosphorus containing condensation product as produced by the process of claim 1;
b) organic polyisocyanate.

26. The flame-retardant composition produced by mixing and reacting the following components:
a) flame-retardant boron-phosphorus containing condensation product as produced by the process of claim 1;
b) organic polyisocyanate;
c) polyol.

27. The flame-retardant composition produced by mixing and reacting the following components:
a) salt of the flame-retardant boron-phosphorus containing condensation product as produced by the process of claim 1;
b) organic polyisocyanate;
c) polyol;
d) foam stabilizer;
e) polyisocyanate catalyst;
f) chemically inert blowing agent.

28. The flame-retardant composition produced by mixing and reacting the following components:

a) flame-retardant boron-phosphorus containing condensation product as produced by the process of claim 1;
b) polymerizable monomer;
c) radical initiator.

29. The flame-retardant composition produced by mixing and reacting the following components:
a) flame-retardant boron-phosphorus containing condensation product as produced by the process of claim 1;
b) polyester resin;
c) radical initiator.

30. The flame-retardant composition produced by mixing and reacting the following components:
a) flame-retardant boron-phosphorus containing condensation product as produced by the process of claim 1;
b) polyepoxy compound;
c) polyepoxy catalyst.

31. The cellulosic material impregnated with a fire retardant amount of the flame-retardant boron-phosphorus containing condensation product produced by the process of claim 1.

32. An aqueous solution and/or emulsion of the flame-retardant boron phosphorus containing condensation produce produced by the process of claim 1.

33. The flame-retardant boron phosphorus containing composition produced by mixing and reacting the following components:
A. acidic boron containing compound
B. acidic phosphorus containing compound
then mixing with and/or coating a plastic with the reacted product of Components A and B.

34. The flame-retardant composition produced by mixing and reacting the following components:
A. acidic boron containing compound
B. acidic phosphorus containing compound
then mixing with and/or coating a natural material with the reacted product of Components A and B.

35. A flame-retardant salt of boron-phosphorus containing condensation product produced by the process which comprises of mixing and reacting the following components:
A. boric acid,
B. phosphoric acid,
C. salt forming basic compound,
components A and B first mixed and reacted to produce a boron-phosphorus containing condensation product, which is then mixed and reacted with Component C to adjust the pH.

36. The cellulosic material impregnated with a fire retardant amount of the flame-retardant boron-phosphorus containing condensation product produced by mixing and reacting 1–25 percent by weight of an acidic boron containing compound and 1–100 parts by weight of acidic phosphorus containing compound which is further reacted with up to 100 parts by weight of a basic salt forming compound which adjusts the pH of the mixture.

37. The flame-retardant composition produced by the process which comprises of mixing and reacting the following components:
a) flame-retardant boron-phosphorus containing condensation product produced by mixing and reacting 1–25 percent by weight of an acidic boron containing compound and 1–100 parts by weight of a phosphorus containing compound;
b) epoxy compound;
c) polyalcohol compound.

* * * * *